(12) United States Patent
Bedus et al.

(10) Patent No.: US 10,202,184 B1
(45) Date of Patent: Feb. 12, 2019

(54) TRANSPARENT STRUCTURE FOR A WINDOW, AND AN AIRCRAFT

(71) Applicant: AIRBUS HELICOPTERS, Marignane (FR)

(72) Inventors: Olivier Bedus, Aurons (FR); Sebastien Testa, Nordendorf (DE); Adrien Perret, Ventabren (FR)

(73) Assignee: AIRBUS HELICOPTERS, Marignane (FR)

( * ) Notice: Subject to any disclaimer, the term of this patent is extended or adjusted under 35 U.S.C. 154(b) by 0 days.

(21) Appl. No.: 15/835,540

(22) Filed: Dec. 8, 2017

(51) Int. Cl.
| | |
|---|---|
| *B64C 1/14* | (2006.01) |
| *B60J 10/86* | (2016.01) |
| *B60J 1/00* | (2006.01) |
| *B60J 1/14* | (2006.01) |

(52) U.S. Cl.
CPC .............. *B64C 1/1492* (2013.01); *B60J 1/002* (2013.01); *B60J 1/14* (2013.01); *B60J 10/86* (2016.02)

(58) Field of Classification Search
CPC .. B64C 1/1492; B60J 10/86; B60J 1/14; B60J 1/002
USPC ................................ 244/129.3, 129.4, 129.5
See application file for complete search history.

(56) References Cited

U.S. PATENT DOCUMENTS

| | | | | |
|---|---|---|---|---|
| 3,990,186 A * | 11/1976 | Gebhard | ..................... | B60J 1/14 49/393 |
| 5,031,863 A * | 7/1991 | Noble | .................... | B64C 1/1407 244/129.5 |
| 5,791,727 A * | 8/1998 | Doescher | ................... | B60J 1/14 296/146.16 |
| 5,809,706 A * | 9/1998 | Neaux | ........................ | B60J 1/14 296/84.1 |
| 5,826,824 A * | 10/1998 | Martin | ...................... | B64C 1/32 244/129.3 |
| 5,931,415 A * | 8/1999 | Lingard | .................. | B64C 1/143 244/129.4 |
| 6,412,225 B1 * | 7/2002 | McManus | .............. | B62D 31/02 49/381 |

(Continued)

FOREIGN PATENT DOCUMENTS

| | | |
|---|---|---|
| AU | 3979972 | 9/1973 |
| FR | 447144 A | 12/1912 |

(Continued)

OTHER PUBLICATIONS

French Search Report for French Application No. FR 1601482, Completed by the French Patent Office, dated Jul. 13, 2017, 7 pages.

*Primary Examiner* — Joshua K Ihezie
(74) *Attorney, Agent, or Firm* — Brooks Kushman P.C.

(57) ABSTRACT

A transparent structure provided with a transparent support wall and a transparent mobile wall. The mobile wall is articulated on the support wall by at least one hinge mechanism. Each hinge mechanism has an immobile element as well as a mobile element and a pivot which articulates the immobile element on the mobile element, the pivot extending according to an axis of rotation, the axis of rotation being offset relative to the seal transversely, while being situated on a plane orthogonal to a immobile second face and not passing via the seal, the axis of rotation being offset relative to the seal in elevation, and not being incorporated in the opening which can be closed by the mobile wall.

18 Claims, 2 Drawing Sheets

(56) References Cited

U.S. PATENT DOCUMENTS

| | | | |
|---|---|---|---|
| 8,826,597 B2 * | 9/2014 | Raspic | B61D 19/023 244/129.3 |
| 2003/0141415 A1 * | 7/2003 | Leclerc | B64C 1/1407 244/129.5 |
| 2006/0258280 A1 * | 11/2006 | Hagen | B60H 1/00428 454/69 |
| 2010/0187358 A1 * | 7/2010 | Voss | B64C 1/18 244/129.4 |
| 2010/0294887 A1 * | 11/2010 | Depeige | B64C 1/1407 244/129.5 |
| 2012/0085865 A1 * | 4/2012 | Gorgoglione | B64C 1/1407 244/129.5 |
| 2012/0193474 A1 * | 8/2012 | Lafon | B64C 1/1484 244/129.3 |
| 2014/0047772 A1 * | 2/2014 | Hulst | B60J 1/14 49/383 |
| 2015/0145285 A1 * | 5/2015 | De Smet | B60J 1/007 296/190.1 |
| 2016/0355249 A1 * | 12/2016 | Joussellin | B64C 1/1492 |

FOREIGN PATENT DOCUMENTS

| | | | |
|---|---|---|---|
| FR | 2787498 A1 | 6/2000 | |
| FR | 2935644 A1 | 3/2010 | |
| WO | 2006020235 A1 | 2/2006 | |

\* cited by examiner

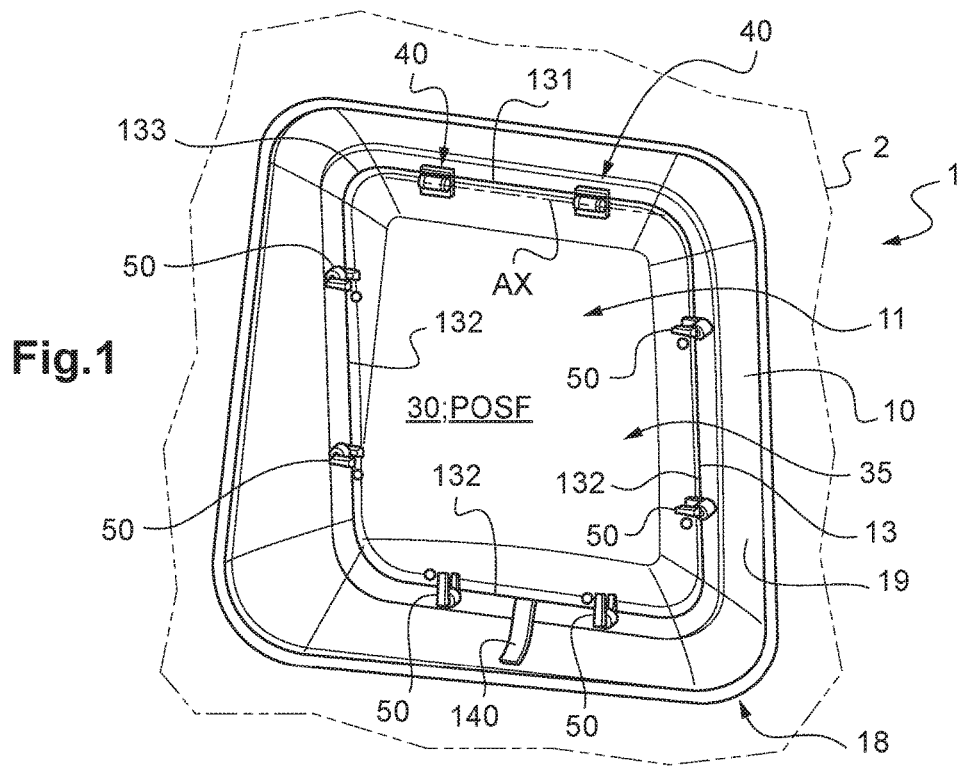
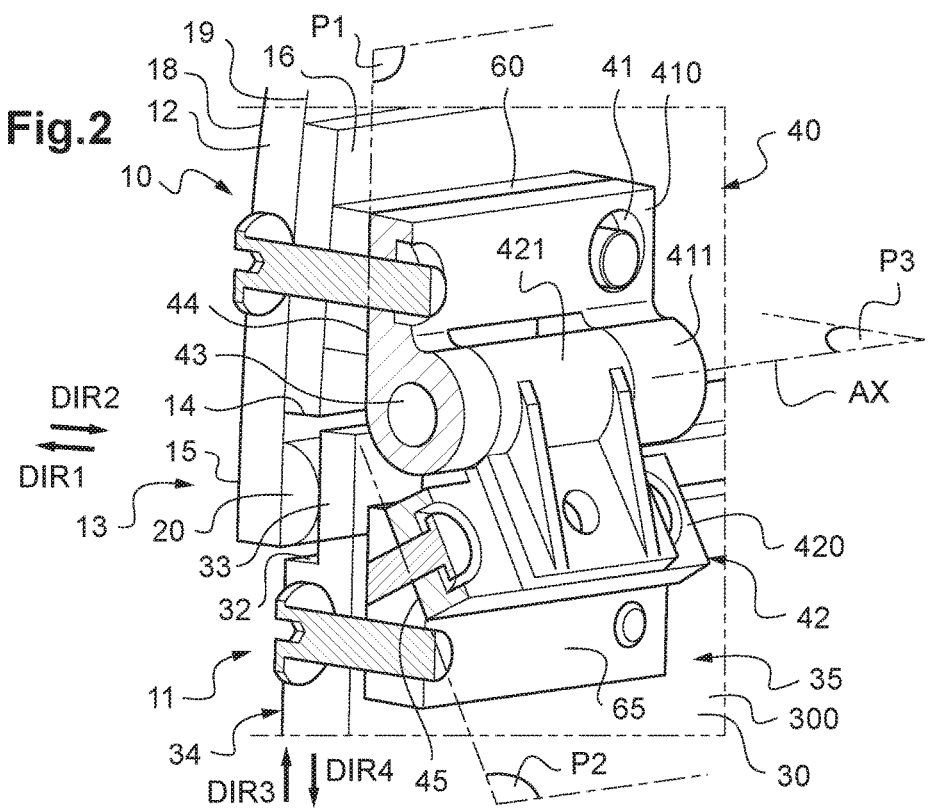

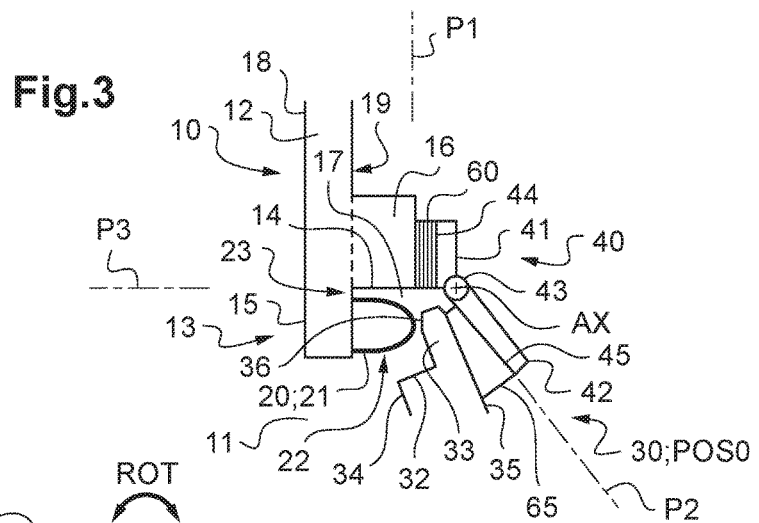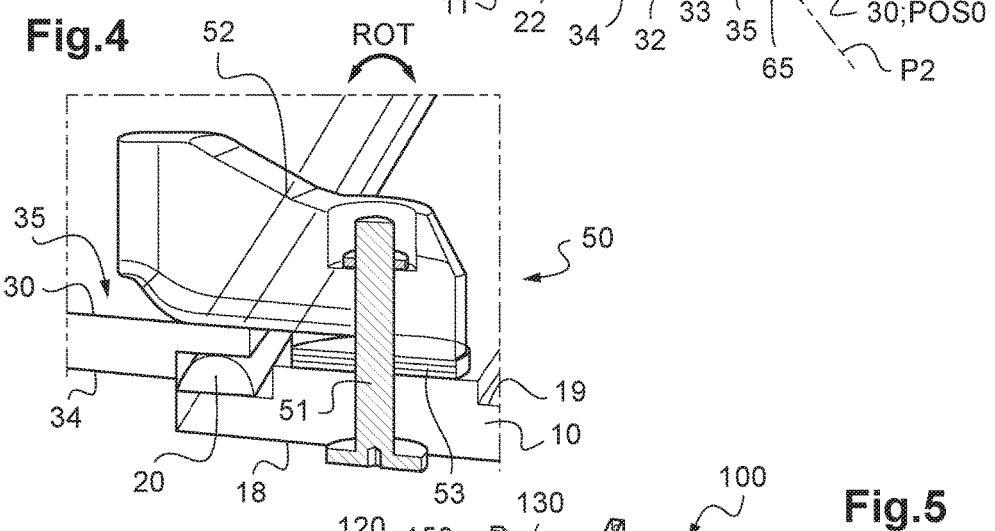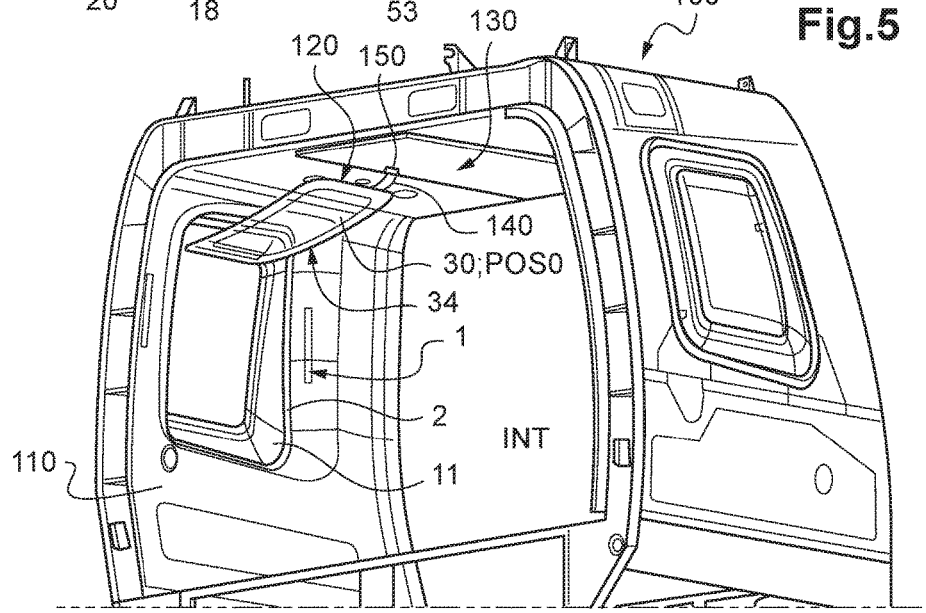

TRANSPARENT STRUCTURE FOR A WINDOW, AND AN AIRCRAFT

BACKGROUND OF THE INVENTION (1) Field of the Invention

The present invention relates to a transparent structure for a window and an aircraft.

2) Description of Related Art

An aircraft, and in particular a rotor aircraft, can comprise a support structure provided with a window which is closed by a transparent structure. For example, a door or a lateral partition of an aircraft can comprise a window of this type.

The term "transparent" relates to a unit which allows waves visible to a human being to pass through, so that an individual can see an outside environment through this unit.

This transparent structure can be provided with a transparent wall which is immobile within the reference frame of the support structure. The window is then permanently closed.

In order to allow an operator to observe precisely the environment outside the aircraft without opening a door, for example during a winching operation, the transparent wall can comprise a bubble. The bubble projects from the support structure transversely towards the outdoor environment. Although efficient, a bubble of this type tends to generate a dynamic drag which is detrimental when the aircraft is carrying out an advance flight phase.

Alternatively, the transparent structure can comprise a transparent support wall. The support wall delimits an opening incorporated in this support wall. Thus, the support wall supports a transparent mobile wall which is mobile relative to the support wall. The mobile wall can close the opening in the support wall, at least partially and when required. In a closed position, the mobile wall closes the opening in the support wall. In an open position, the mobile wall does not close the opening in the support wall, or closes it partially.

For example, the airplane known by the name TB-10 and the helicopter AW149® made by AGUSTA have a transparent structure of this type.

The production of a transparent structure of this type can be problematic. In particular, obtaining a sealed interface between the support wall and the mobile wall can be difficult to obtain, in particular with a large-sized mobile wall. A seal can be arranged between the support wall and the mobile wall, but a seal of this type tends to deteriorate, which leads to a limited service life.

Certain documents discuss related technology.

Thus, document FR 2.935.644 describes a transparent structure for a door. The transparent structure is provided with a first glazed panel. In addition, a second glazed panel is fitted such as to be mobile in rotation relative to the first glazed panel around an axis of pivoting.

The second panel is thus fitted on the door by means of a hinge mechanism. The second panel is not strictly speaking incorporated in the first panel.

Document FR 2.787.498 describes a glazed opening with a mobile shutter. The shutter can be mobile in rotation around the axis of rotation of an articulation. This articulation is complex, comprising a base which is integral with the glazed opening, a lever which is integral with the shutter and is articulated on the base, pin-type springs, stops, etc.

Document U.S. Pat. No. 5,809,706 discloses a transparent opening which is mobile within a transparent support wall. The opening can be a pivoting opening which is articulated on the support wall by a hinge mechanism. This hinge mechanism is provided with an immobile element which is attached to the support wall, and with a mobile element which is attached to the opening.

The mobile element is articulated on the immobile element around an axis of articulation by means of a pivot. In addition, when the opening is closed, the immobile element and the mobile element are coplanar.

For information, the term "hinge" sometimes designates the immobile element of the hinge mechanism. Thus, the term "hinge" sometimes designates the mobile element of the hinge mechanism which is mobile in rotation relative to the immobile element around the pivot. This pivot extends according to an axis of rotation of the hinge mechanism, with the pivot passing through at least one lug of the immobile element and at least one lug of the mobile element. The pivot can be in the form of a rod, and is sometimes known as a "hinge pin".

Document WO 2006/020.235 discloses a transparent opening for a vehicle. This opening is articulated on uprights of a structure.

Document Au3979972 describes a deflector to deflect a flow of air or rain.

Document FR 447144 is also known.

BRIEF SUMMARY OF THE INVENTION

The objective of the present invention is thus to propose a transparent structure for a window, in particular for an aircraft, provided with a transparent support wall as well as with a transparent mobile wall which is intended to optimize the service life of a seal. The mobile wall can be classified as an opening.

Thus, the subject of the invention is a transparent structure for a window, this transparent structure being provided with a transparent support wall which is immobile within a reference frame of the transparent structure, the support wall delimiting an opening, the transparent structure comprising a transparent mobile wall, this mobile wall being fitted such as to be mobile on the support wall in order to close the opening in a closed position, and in order not to close the opening, at least partially, in an open position, the thickness of the support wall extending from a face known as the "immobile first face" to a face known as the "immobile second face", the thickness of the mobile wall extending from a face known as the "mobile first face" to a face known as the "mobile second face".

This transparent structure comprises a seal. This seal is supported by the support wall, this seal surrounding the opening, this seal being compressed by the mobile wall in the closed position.

In addition, the mobile wall is fitted such as to be mobile in rotation on the support wall, the mobile wall being articulated on the support wall by at least one hinge mechanism. Each hinge mechanism has an immobile element as well as a mobile element and a pivot articulating the immobile element on the mobile element, the pivot extending according to an axis of rotation, the axis of rotation being offset relative to the seal transversely, whilst being situated on a plane orthogonal to the immobile second face, and not passing via the seal, the axis of rotation being offset relative to the seal in elevation, and not being incorporated in the opening, the immobile element comprising a face known as the "immobile support face" which is rendered integral with the support wall, the immobile support face being opposite the immobile second face and contained on a plane known as the "immobile plane", the mobile element comprising a face known as the "mobile support face" which is rendered integral with the mobile wall, the mobile support face being opposite the mobile second face and contained on a plane known as the "mobile plane", the mobile plane and the immobile plane being separated by an angle contained between 0° exclusive and 180° exclusive in said closed position.

The transparent structure also comprises at least one latch in order to mobilize the mobile wall in the closed position when required.

The expression "delimiting an opening" means that the support wall has an edge describing a closed line which delimits the opening.

The expression "transversely" refers to directions going from the center of the opening to an edge of the support wall which describes a closed line delimiting the opening. If the opening is in the form of a disk, the term "transverse" can then be associated with the term "radial".

The expression "in elevation" refers to directions orthogonal to the faces of the mobile wall and to the support wall.

The term "latch" refers to a means which is maneuverable by an individual in order to immobilize the mobile wall in the closed position.

Thus, each hinge mechanism has at least one, or only three elements, i.e. the immobile element as well as the mobile element and the pivot. The pivot provides the mobile element with a degree of freedom in rotation around the axis of rotation relative to the immobile element.

In the presence of a plurality of hinge mechanisms, the axes of rotation of the hinge mechanisms are advantageously combined, forming a single axis of rotation.

Thus, these axes of rotation are not arranged in line with the seal, and are not combined with an axis of extension of the seal. In fact, the axes of rotation are offset transversely and in elevation relative to the seal.

In addition, in the closed position, the mobile support plane of the mobile element is distinct from the immobile support plane of the immobile element, contrary to the usual practice.

The pivot of each hinge mechanism is thus offset relative to the seal in order to limit the friction of the mobile wall on the seal during the passage from the closed position to an open position, and conversely.

This offsetting tends to limit the effects of shearing on the seal in order to limit its wear. The service life of the seal and the quality of sealing obtained in the closed position can then be optimized, even with a large-sized mobile wall.

In fact, obtaining acceptable, durable sealing between the mobile wall and the support wall with a large-sized support wall, which for example is approximately 45 cm wide and 55 cm long, is difficult to obtain. A structure according to the invention can tend to solve this problem. For example, the mobile wall can cover a surface area greater then 30% of the total surface area of the transparent structure.

In addition, the transparent structure can comprise one or a plurality of the following characteristics.

Thus, the transparent structure can comprise a retention device in order to retain the mobile wall in the open position when required.

A retention device of this type can comprise a rounded-head stud which is integral with the mobile second face, and can penetrate into a receptacle, a dowel which for example is positioned on a ceiling, and can cooperate with a fastener of the mobile wall, and a cable which is integral with the mobile wall, and can cooperate with a fastener on the exterior of the mobile wall, etc.

According to another aspect, the opening can be incorporated in the support wall.

According to another aspect, at least one of said support wall and mobile wall can be made from poly(methyl methacrylate).

Poly(methyl methacrylate) is also known by the acronym "PMMA".

A material of this type tends to limit the propagation of any cracks within the wall concerned.

According to another aspect, the support wall can comprise a main wall with a first thickness and a reinforcement, the reinforcement being secured on the main wall around said opening, said immobile element being secured on the reinforcement.

The support wall can thus have a narrow mean thickness, whilst simply being reinforced around the opening.

The reinforcement can be made of a transparent material, and for example the same material as the main wall.

According to another aspect, at least one wedge can be interposed between the immobile support face and the reinforcement.

The wedge can make it possible to optimize the position of the axis of rotation of the corresponding hinge mechanism relative to the seal.

A block of wedging material can be positioned between the mobile support face and the mobile wall.

The block of wedging material can make it possible to optimize the position of the axis of rotation of the corresponding hinge mechanism relative to the seal.

According to another aspect, the support wall can comprise a peripheral border surrounding the opening and a peripheral cut-off edge which projects transversely from the peripheral border and is flush with the immobile first face, the peripheral cut-off edge delimiting in elevation a groove in which the seal is positioned, the peripheral border delimiting the groove transversely, the mobile wall comprising a cut-off edge on the exterior of its periphery, the exterior cut-off edge comprising a chamfer opposite the seal and the groove, the chamfer being in contact with said seal in said closed position.

The peripheral cut-off edge and the peripheral border can form a structure which has the form of an "L" in cross-section in order to delimit the groove.

Similarly, the exterior cut-off edge can make it possible to form a structure which has the form of an "L" on the periphery of the mobile wall.

Thus, the chamfer makes it possible to limit the friction of the mobile wall on the seal.

In addition, the peripheral cut-off edge can constitute an obstacle making it possible to limit the probability of the mobile wall passing through the opening from one side to the other. For example, and on an aircraft, this characteristic can limit the risks of ejection of the mobile wall from the aircraft.

According to another aspect, the seal can be secured on the peripheral cut-off edge.

According to another aspect, a transverse gap can separate the seal from the peripheral border when the mobile wall is in an open position.

This gap tends at least to limit the compression of the seal against the support wall in the closed position.

According to another aspect, the seal can be a flange seal.

A seal of this type can be sufficiently "resilient" to permit the positioning of the mobile wall in the closed position, whilst being resistant.

According to another aspect, the seal can be covered with a protective resin.

A resin of this type can be an anti-friction resin of the silicon type, in order to limit the wear of the seal.

According to another aspect, the latch can comprise a stud secured on the support wall, said stud projecting from said support wall in a direction of extension, said latch comprising a lever which is mobile in rotation around said stud, said lever extending transversely in a direction perpendicular to the direction of extension, said latch comprising a peelable wedge in contact with the lever.

According to another aspect, the mobile wall can be incorporated in the opening in the closed position, the mobile first face not being flush with the immobile first face, whilst being recessed in said opening.

On the other hand, the mobile second face can be flush with the immobile second face.

According to another aspect, the support wall can be secured on a window frame by conventional securing means.

Securing means of this type can comprise a standard securing structure provided with a seal for example.

According to another aspect, with the opening being able to be delimited by a rim which follows a closed line with a plurality of segments, and with said at least one hinge mechanism comprising a plurality of hinge mechanisms, said hinge mechanisms can be secured on a single segment.

Each segment without said hinge mechanisms can cooperate with at least one latch, and optionally with two latches.

The invention further relates to an aircraft provided with a partition delimiting a window, this aircraft comprising a transparent structure of the type previously described in order to close said window. The support wall is thus secured on the partition.

Optionally, the mobile second face in the closed position and the immobile second face are opposite an inner space of said aircraft.

BRIEF DESCRIPTION OF THE DRAWINGS

The invention and its advantages will become more apparent in greater detail within the context of the description which follows, with examples provided by way of illustration, with reference to the appended figures which represent:

FIG. 1 is a view of a transparent structure according to the invention;

FIG. 2 is a view of a hinge mechanism;

FIG. 3 is a schematic cross-section of a hinge mechanism;

FIG. 4 is a schematic view of a latch; and

FIG. 5 is a view of an aircraft according to the invention.

The elements which are present in a plurality of distinct figures are allocated a single reference.

DETAILED DESCRIPTION OF THE INVENTION

FIG. 1 shows a transparent structure 1 according to the invention.

The transparent structure comprises a support wall 10. This support wall 10 is transparent, and is made for example from a material of the poly(methyl methacrylate) type.

The support wall 10 is for example secured on a window frame by conventional means for closing a window partially.

In addition, the support wall 10 delimits an opening 11 of the window.

This opening 11 can be fully incorporated in the support wall 10. Thus, the support wall has an annular, not necessarily circular form, extending from an exterior rim to be secured on a window frame at an inner rim 13 which delimits the opening 11.

In addition, the thickness of the support wall 10 extends from a face known as the "immobile first face 18" to a face known as the "immobile second face 19".

The transparent structure 1 additionally comprises a wall known as the transparent "mobile wall 30".

Like the support wall 10, the mobile wall 30 is for example made of poly(methyl methacrylate), and for example can have a thickness of 8 mm. A thickness of this type can make it possible to provide the transparent structure with rigidity which is sufficient not to have a bulge effect, and to maintain an optimized level of sealing.

In addition, the thickness of the mobile wall 30 extends from a face known as the "mobile first face" to a face known as the "mobile second face 35".

The mobile wall 30 serves the purpose of closing the opening 11 in the closed position POSF illustrated in FIG. 1, and of not closing this opening 11, at least partially, in an open position. In particular, this mobile wall can have large dimensions in order to allow an individual to pass at least his head through the opening 11.

The term "immobile" can thus be associated with a unit which is immobile within the reference frame of the transparent structure 1, whereas the term "mobile" can thus be associated with a unit which is mobile within the reference frame of the transparent structure 1.

Thus, the mobile wall 30 is fitted such as to be mobile on the support wall 10 in order to close or not to close the opening 11 when required.

For this purpose, the mobile wall 30 is articulated on the support wall 10 around an axis of rotation AX by means of at least one hinge mechanism 40. FIG. 1 illustrates the presence of two hinge mechanisms, but a smaller or larger number of hinge mechanisms can be envisaged.

In addition, a seal which is not shown in FIG. 1 can be positioned between the mobile wall 30 and the support wall 10, in order to ensure that the transparent structure 1 is sealed when the mobile wall is in the closed position. This seal 20 can be supported by the support wall 10, or by its inner rim 13, in order to surround the opening 11. The seal 20 is then compressed by the mobile wall 30 in the closed position POSF.

In addition, the transparent structure 1 comprises at least one latch 50 in order to immobilize the mobile wall 30 in the closed position POSF when required.

For example, the opening 11 can be delimited by the inner rim 13 according to a closed line with a plurality of segments 131, 132, two adjacent segments being connected by a wedge 133.

Thus, hinge mechanisms 40 are secured on a single segment 131.

In the presence of a single hinge mechanism, this hinge mechanism can be in the middle of a segment.

In addition, the mobile portion 30 extends in elevation from a lower segment to an upper segment, the upper segment being substantially contained on an upper horizontal plane which is plumb with a lower horizontal plane substantially containing the lower segment. Thus, each hinge mechanism 40 can be secured on the upper segment. In fact, it may be advantageous to put the hinge mechanisms in the high position in order not to impede the subsequent displacement of passengers, for example in the event of evacuation.

In addition, each segment 132 without said hinge mechanisms 40 can be secured on at least one latch 50. In particular, the hinge mechanisms 40 can be secured on a single segment 131, and each segment 132 without said hinge mechanisms 40 can cooperate with two latches 50.

FIG. 2 presents a hinge mechanism 40 positioned on the support wall 10 and on the mobile wall 30.

Each hinge mechanism 40 can comprise an immobile element 41, as well as a mobile element 42 and a pivot 43. The pivot 43 then articulates the immobile element 41 on the mobile element 42, by providing the mobile element 42 with a degree of freedom in rotation relative to the immobile element 41 around the axis of rotation AX.

Thus, the immobile element 41 is provided with a seat known as the "immobile seat 410" to be secured on the support wall 10. In addition, the immobile element 41 is provided with a an armature which is integral with the immobile seat 410. This armature comprises for example at least one immobile lug 411 which is integral with the immobile seat 410.

In order to be secured on the support wall 10, the immobile seat 410 has a face known as the "immobile support face 44" to be attached against the support wall 10. The immobile support face 44 is opposite the immobile second face 19, and contained on a plane known as the "immobile plane P1".

Thus, the support wall can comprise a single wall attached against the immobile support face 44 by using for example screwing means which screw the immobile element on the support wall. Alternative means are possible such as means for gluing, riveting, etc.

Alternatively, the support wall can have a main wall 12. This main wall 12 has for example a thickness of approximately 5 mm.

In addition, the support wall can have a reinforcement 16 at the inner rim 13. This reinforcement 16 is then secured on the main wall 12 around the opening 11, by being positioned on the immobile second face, for example. The reinforcement 16 can have for example a thickness of approximately 5 mm.

Thus, the immobile seat 410 is supported on the reinforcement.

For example, the immobile support face 44 is attached directly on the reinforcement 16, or indirectly by means of at least one wedge 60 which is interposed between the immobile support face 44 and the reinforcement 16. This wedge 60 can be a peelable wedge with a thickness which can be adjusted by removing layers of the wedge 60.

Similarly, the mobile element 42 can be provided with a seat known as the "mobile seat 420" to be secured on the mobile wall 30. In addition, the mobile element 42 is provided with an armature which is integral with the mobile seat 420. This armature comprises for example at least one mobile lug 421 which is integral with the mobile seat 420.

Similarly, the mobile element 42 can be provided with a seat known as the "mobile seat 420" to be secured on the mobile wall 30. In addition, the mobile element 42 is provided with an armature which is integral with the mobile seat 420. This armature comprises for example at least one mobile lug 421 which is integral with the mobile seat 420.

Thus, the mobile wall 30 can comprise a single wall attached against the mobile support face 45 by using for example screwing means which screw the immobile element on the support wall. Alternative means are possible such as means for gluing, riveting, etc.

Alternatively, the support wall can have a primary wall 300 which can cover the opening 11. Thus, the mobile support face 45 can be secured on the primary wall 300 by a block of wedging material 65. The block of wedging material 65 can be a peelable wedge with a thickness which can be adjusted by removing layers of the block of wedging material 65.

Optionally, and like the support wall, the mobile wall can comprise a reinforcement.

According to another aspect, the pivot can comprise at least one elongate unit which passes through the mobile lugs 421 and the immobile lugs 411. The elongate unit can be in the form of at least one rod for example.

According to another aspect, the seal 20 is interposed between the inner rim 13 of the support wall and a periphery of the mobile wall 30.

For example, the inner rim 13 can have the form of an "L" delimiting a groove 17 in which the seal 20 is located. Thus, the inner rim 13 has a peripheral border 14. The peripheral border 14 extends according to the thickness of the support wall, surrounding the opening 11. If applicable, the peripheral border 14 can represent the section of a reinforcement 16.

In addition, the inner rim 13 has a peripheral cut-off edge 15 which projects transversely from the peripheral border 14, flush with the immobile first face 18. If applicable, the peripheral cut-off edge 15 can represent a portion of the main wall 12 projecting from the reinforcement 16.

Thus, the peripheral cut-off edge 15 delimits the groove 17 in elevation in a direction DIR1 going from the immobile second face 19 to the immobile first face 18. In addition, the peripheral border 14 delimits the groove 17 transversely in the direction DIR3 going from the opening 11 to the outer rim.

Similarly, the mobile wall 30 can have a periphery in the form of an "L" with an outer cut-off edge 33 opposite the peripheral cut-off edge 15, and an outer border 32 opposite the peripheral border 14 in the closed position of the mobile wall. The outer cut-off edge 33 delimits the groove 17 in elevation in a direction DIR2 going from the immobile first face 18 to the immobile second face 19. In addition, the outer border 32 delimits the groove 17 transversely in the direction DIR4 going from the outer rim to the opening 11.

In this context, the seal 20 can be secured on the peripheral cut-off edge 15.

According to another aspect, FIG. 2 illustrates a variant according to which the mobile wall 30 is incorporated in the opening 11 in the closed position POSF, with the mobile first face 34 not being flush with the immobile first face 18, and being recessed in the opening 11.

In order to limit the wear of the seal by friction with the mobile wall, the mobile plane P2 and the immobile plane P1 are also separated by an angle contained between 0° exclusive and 180° exclusive in said closed position POSF.

In addition and with reference to FIG. 3, a transverse gap 23 can separate the seal 20 from the peripheral border 14 when the mobile wall 30 is in an open position POSO.

Also, the seal 20 can be a seal which is conventionally known as a "flange seal 21".

In order to limit the wear of the seal by friction with the mobile wall, the seal 20 can be covered with a protective resin 22. The protective resin can be a so-called "antifretting" resin.

According to another aspect, the axis of rotation AX of the mobile element 30 relative to the immobile element 41 is offset relative to the seal 20, in order to limit the wear of the seal.

Thus, this axis of rotation AX is offset transversely relative to the seal, whilst being situated on a plane P3 which is orthogonal to the immobile second face 19, and does not pass via the seal 20.

In addition, the axis of rotation AX is offset relative to the seal 20 in elevation, and is not incorporated in the opening 11.

In addition, the outer cut-off edge 33 can comprise a chamfer 36 opposite said seal 20 and the groove 17. This chamfer 36 is in contact with the seal 20 in the closed position POSF, but tends to limit the friction of the mobile wall 30 on the seal 20 during its maneuvering.

FIG. 4 illustrates a latch 50 according to the invention.

This latch 50 comprises a stud 51 secured on the support wall 10. This stud 51 projects from the support wall 10 in a direction of extension going from the immobile first face 18 to the immobile second face 19.

In addition, the stud supports a peelable wedge 53, which for example is screwed onto a thread of the stud. The stud can comprise a head, the mobile wall being wedged between the head of the stud and the peelable wedge.

Also, the latch 50 comprises a lever 52 which is mobile in rotation around an end of the stud 51. This lever 52 extends in a direction perpendicular to the direction of extension. Thus, the lever can be displaced either to be supported against the mobile second face 35 of the mobile wall 30, in order to immobilize the mobile wall, or to be positioned in line with the support wall 10 in order to permit the rotation of the mobile wall 30.

Optionally, the mobile wall can have a receipt structure, schematized in FIG. 1, which cooperates with the lever when the latch immobilizes the mobile wall. The receipt structure can comprise two ramps which open onto a hollow in which the latch is positioned in order to retain the mobile wall in the closed position. In order to open the cabin window, the lever is extracted from the hollow by sliding on a ramp.

FIG. 5 illustrates a vehicle 100 provided with a partition 110 delimiting a window. A vehicle of this type can in particular be an aircraft. In addition, this partition can be a door or a wall of the vehicle 100 which separates an inner space INT of the vehicle 100 and an environment situated on the exterior of the vehicle.

The mobile second face 35 in the closed position, and the immobile second face 19, are for example opposite the inner space INT of said aircraft 10.

In addition, the transparent structure 1 can comprise a retention device 120 in order to retain the mobile wall in its open position POSO. A device of this type comprises for example a fastener integral with the mobile wall 30, which cooperates with an offset fastener. For example, an offset fastener of this type can be provided on a ceiling 130.

Alternatively or in addition, a retention device can comprise a strap 140. This strap 140 extends along its length from a first end to a second end. The strap 140 is secured at its first end on the opening, i.e. on the mobile portion, for example by means of a Velcro® loop, and at its second end by a coupling system 150 such as a push button or an equivalent for example.

It will be appreciated that the present invention is subject to numerous variations in terms of its implementation. Although a plurality of embodiments have been described, it is understood that it is not feasible to identify all the possible embodiments exhaustively. It can clearly be envisaged to replace a means described by an equivalent means without departing from the context of the present invention.

What is claimed is:

1. A transparent structure for a window, the transparent structure being provided with a transparent support wall which is immobile within a reference frame of the transparent structure, the support wall delimiting an opening, the transparent structure comprising a transparent mobile wall, the mobile wall being fitted such as to be mobile on the support wall in order to close the opening in a closed position, and in order not to close the opening, at least partially, in an open position, the thickness of the support wall extending from an immobile first face to an immobile second face, the thickness of the mobile wall extending from a mobile first face to a mobile second face, wherein a seal is supported by the support wall, the seal surrounding the opening, the seal being compressed by the mobile wall in the closed position;

the mobile wall is fitted such as to be mobile in rotation on the support wall, the mobile wall being articulated on the support wall by at least one hinge mechanism, each hinge mechanism having an immobile element as well as a mobile element and a pivot articulating the immobile element on the mobile element, the pivot extending according to an axis of rotation, the axis of rotation being offset relative to the seal transversely, whilst being situated on a plane orthogonal to the immobile second face, and not passing via the seal, the axis of rotation being offset relative to the seal in elevation, and not being incorporated in the opening, the immobile element comprising an immobile support face which is rendered integral with the support wall, the immobile support face being opposite the immobile second face and contained on an immobile plane, the mobile element comprising a mobile support face which is rendered integral with the mobile wall, the mobile support face being opposite the mobile second face and contained on a mobile plane, the mobile plane and the immobile plane being separated by an angle contained between 0° exclusive and 180° exclusive in the closed position; and the transparent structure comprises at least one latch in order to immobilize the mobile wall in the closed position when required.

2. The transparent structure as claimed in claim 1, wherein the opening is incorporated in the support wall.

3. The transparent structure as claimed in claim 1, wherein at least one of the support wall and mobile wall is made from poly(methyl methacrylate).

4. The transparent structure as claimed in claim 1, wherein the support wall comprises a main wall and a reinforcement, the reinforcement being secured on the main wall around the opening, the immobile element being secured on the reinforcement.

5. The transparent structure as claimed in claim 4, wherein at least one wedge is interposed between the immobile support face and the reinforcement.

6. The transparent structure as claimed in claim 4, wherein a block of wedging material is positioned between the mobile support face and the mobile wall.

7. The transparent structure as claimed in claim 1, wherein the support wall comprises a peripheral border surrounding the opening and a peripheral cut-off edge which projects transversely from the peripheral border and is flush with the immobile first face, the peripheral cut-off edge delimiting in elevation a groove in which the seal is positioned, the peripheral border delimiting the groove transversely, the mobile wall comprising a cut-off edge on the exterior of its periphery, the exterior cut-off edge comprising a chamfer opposite the seal and the groove, the chamfer being in contact with the seal in the closed position.

8. The transparent structure as claimed in claim 7, wherein the seal is secured on the peripheral cut-off edge.

9. The transparent structure as claimed in claim 7, wherein a transverse gap separates the seal from the peripheral border when the mobile wall is in an open position.

10. The transparent structure as claimed in claim 1, wherein the seal is a flange seal.

11. The transparent structure as claimed in claim 1, wherein the seal is covered with a protective resin.

12. The transparent structure as claimed in claim 1, wherein the latch comprises a stud secured on the support wall, the stud projecting from the support wall in a direction of extension, the latch comprising a lever which is mobile in rotation around the stud, the lever extending transversely in a direction perpendicular to the direction of extension, the latch comprising a peelable wedge in contact with the lever.

13. The transparent structure as claimed in claim 1, wherein the mobile wall is incorporated in the opening in the closed position, the mobile first face not being flush with the immobile first face, whilst being recessed in the opening.

14. The transparent structure as claimed in claim 1, wherein the support wall is secured on a window frame.

15. The transparent structure as claimed in claim 1, wherein, with the opening being delimited by an inner rim which follows a closed line with a plurality of segments, and with the at least one hinge mechanism comprising a plurality of hinge mechanisms, the hinge mechanisms are secured on a single segment.

16. The transparent structure as claimed in claim 15, wherein each segment without the hinge mechanisms cooperates with at least one latch.

17. An aircraft provided with a partition delimiting a window, wherein the aircraft comprises a transparent structure as claimed in claim 1, in order to close the window.

18. The aircraft as claimed in claim 17, wherein the mobile second face in the closed position and the immobile second face are opposite an inner space of the aircraft.

* * * * *